Figure 1:
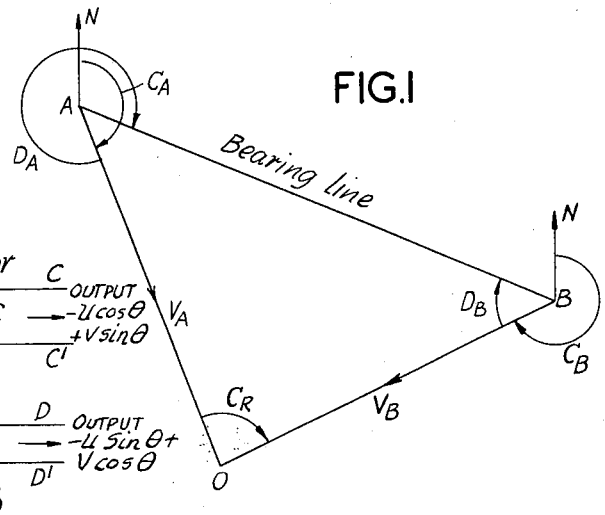

Jan. 4, 1966  H. P. FREEDMAN  3,227,862

COMPUTING APPARATUS

Filed Aug. 25, 1959

INVENTOR:
HAROLD PHILIP FREEDMAN

BY
Richardson, David and Nardon
ATTY'S.

United States Patent Office 3,227,862
Patented Jan. 4, 1966

3,227,862
COMPUTING APPARATUS
Harold Philip Freedman, Twickenham, England, assignor to Avel Corporation Geneva, Geneva, Switzerland
Filed Aug. 25, 1959, Ser. No. 835,938
Claims priority, application Great Britain, Sept. 10, 1958, 29,039/58
4 Claims. (Cl. 235—150.24)

This invention concerns improvements in or relating to collision computing apparatus.

In the specification of the co-pending application Serial No. 690,377, now Patent No. 2,980,908 (hereinafter called the "prior application") there was described a method and apparatus for the exchange between two moving vessels of course parameters and more specifically for the exchange of course (relative to North for example) and speed together (in the case of aircraft) with height. It is an object of the present invention to provide improved apparatus for determining the risk of collision and which operates more rapidly than mechanical apparatus.

According to one aspect of the present invention there is provided apparatus for determining the risk of collision comprising means for determining the difference of the components of velocity of the two vessels normal to the mutual bearing line and for indicating if such difference is substantially zero.

According to a further aspect of the present invention there is provided apparatus for determining the risk of collision between two vessels, comprising first means for computing the components of velocity of the two vessels along the mutual bearing line and for determining whether the sum of such components is positive and second means for computing the components of velocity normal to the mutual bearing line and for determining whether the difference of such components is substantially zero.

The present invention is designed to be complementary to the equipment described in the said prior application and wherein each vessel is made aware of the mutual bearing, course and speed of the other vessel, but quite clearly the present invention may be applied to any other form of apparatus which provides these data items. It is a basic assumption in the computation of a collision risk that the vessels will continue upon a non-manoeuvring course and it is also a basic assumption (in the case of two aircraft) that they are at the same height. It should be made clear that in the computation of a collision risk it is always possible to operate upon a proposed course, for example to determine whether it will be safe to adopt such a proposed course.

In the computation of a collison risk it will be found that a vector triangle may be set up to show the relative courses and speeds of the two vessels with respect to the first line and it can be shown that collision will only take place if (on the basis of a specific convention of signs) the sum of the resolved components of velocity along the first line has a certain range of values and if the sum of the components of velocity resolved normal to the first line has another range of values.

In the preferred arrangement, the first line is the mutual bearing line and, for a collision risk to be present, the sum of the components along this line is positive (representing a positive velocity of approach) whilst the sum of the components normal to this line is substantially zero (representing zero rate of change of mutual bearing).

It should be noted that the components of velocity are directive and that throughout this specification a certain convention is used to take this into account, the convention defining the method of measuring angles.

The apparatus of the present invention, therefore, is designed to operate upon the course and speed parameters in such away as to automatically resolve the components of velocity of the two vessels along these two lines and to perform the necessary sum and difference calculations to evaluate the collision risk.

Figure 3:
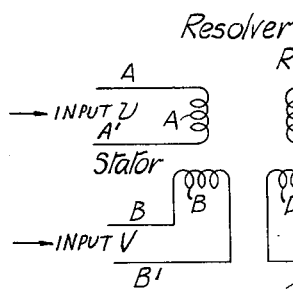
Figure 2:
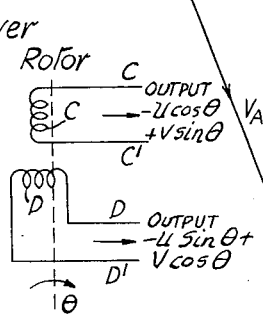
Figure 2:
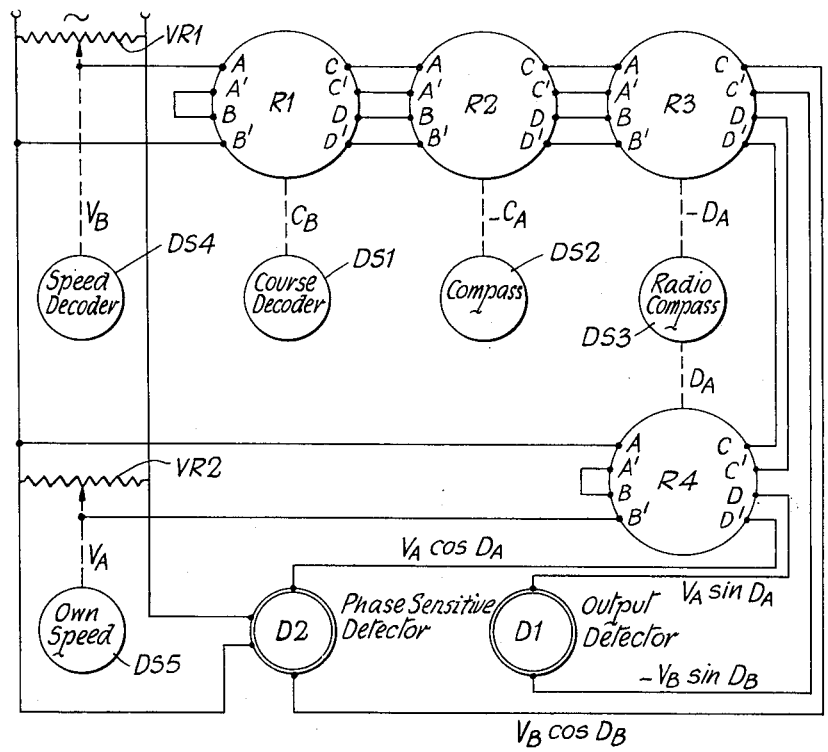

In order that the invention may more readily be understood one embodiment of the same will now be described with reference to the accompanying drawings, wherein:

FIGURE 1 shows a vector triangle;
FIGURE 2 shows a diagrammatic form the apparatus of the present invention for use in one vessel; and
FIGURE 3 shows the connections for the resolvers of FIGURE 2.

Referring firstly to FIGURE 1, vessels A and B are shown. The course of the vessel is along the line AO, i.e. along the course of bearing $C_A$. The speed of the vessel A is $V_A$. Similarly the vessel B is headed along the line BO, i.e. along the course of bearing $C_B$ at a speed $V_B$. The mutual bearing line is, of course, AB and the courses of the two vessels relative to the mutual bearing line are $D_A$ and $D_B$ respectively whilst one angle between the two velocity lines AO and BO is $C_R$. All angles are measured in the normal clockwise direction and courses are measured relative to North which may, of course, be true or magnetic North as mutually decided.

The first computation is a calculation of the value of the sum:

$$V_A \cos D_A + V_B \cos D_B$$

Collision may occur if this sum is greater than or equal to zero.

The second computation is:

$$V_A \sin D_A + V_B \sin D_B$$

The collision condition is that this sum should be approximately zero.

In the apparatus of the said prior application, course and speed are transmitted as codings upon a radio frequency carrier and decoders for course and speed are provided in the equipment of the vessel.

Now referring to FIGURE 2 which shows the apparatus of vessel A, a course decoder is shown at DS1 and a speed decoder at DS4. Similarly a directional radio receiver, for example a radio compass, is provided to home on to the transmissions from the other vessel in order to provide information as to the bearing of the mutual bearing line and this radio compass is shown in FIGURE 2 at DS3. Finally the vessel's own course and speed are derived from a compass repeater DS2 and speed repeater DS5. All the elements DS1 and DS5 produce rotations which depend upon the values of the items of data with which they are associated.

In the apparatus of FIGURE 2, an alternating current supply source is connected to a potentiometer VR1 which is driven by the speed decoder DS4 so that the output from the slider of this potentiometer is proportional to $V_B$. This voltage is passed to one rotor winding of a resolver R1, such resolver being of the two-phase rotor, two-phase stator synchro-resolver type and the rotor of which is mechanically coupled to the course decoder DS1 and the position of which, therefore, corresponds to $C_B$. The outputs from the resolver R1, which are taken from the two pairs of leads connected to the stator windings, are $VB \sin C_B$ and $V_B \cos C_B$. These outputs are connected directly to the rotor windings of a second resolver R2. The resolver connections are shown in FIGURE 3.

The rotor of this second resolver is mechanically coupled to the compass repeater DS2 in reverse so that the position of the rotor corresponds to $-C_A$. The outputs from the stator windings of the resolver R2 will, therefore be $V_B \sin C_R$ and $V_B \cos C_R$, since $C_B - C_A = C_B$.

The outputs from the resolver R2 are passed to the rotor windings of a resolver R3, the rotor thereof being coupled to the radio compass DS3 in reverse so that the position of the rotor corresponds to the angle $-D_A$. The normal outputs of the resolver R3 would be $-V_B \sin D_B$ and $-V_B \cos D_B$, since $D_B = -(C_R - D_A)$, but the output connections from the stator are cross coupled so as to provide respective outputs of $-V_B \sin D_B$ and $+V_B \cos D_B$.

A potentiometer VR2 also connected to the A.C. supply source has its slider driven by the speed repeater DS5 to provide a voltage output which is proportional to $V_A$ and this voltage is fed to a resolver R4 which has its rotor connected directly to the radio compass DS3 so that its position is proportional to the angle $D_A$. In consequence the outputs from the resolver R4 are $V_A \sin D_A$ and $V_A \cos D_A$.

The output from the resolver R3 corresponding to $-V_B \sin D_B$ is passed to an output detector D1 together with the output from the resolver R4 corresponding to $V_A \sin D_A$ and if these two outputs are equal there will be no output from the detector D1. Zero output from the detector D1 corresponds to fulfilment of the first requirement for a collision course.

Similarly the outputs from the resolvers R3 and R4 corresponding to $V_B \cos D_B$ and $V_A \cos D_A$ are passed to a phase sensitive detector D2 which is fed with a reference phase from the supply source. If the sum of these two factors as fed to the detector D2 is greater than zero a positive output will be given by the phase detector D2 to indicate that the two vessels are closing along the mutual bearing line, and that the second condition for collision is fulfilled.

Suitable relays or other devices, coupled to the detectors D1 and D2 to be activated by the detector D1 if there is no output and to be activated by the detector D2 if there is a positive output, may be used to activate a suitable warning system.

The potentiometers VR1 and VR2 may be replaced by any other suitable devices giving variable outputs such as impedance potentiometers or linear variable transformers. The angles, or some of them, may be added by suitable angle adding devices, such as mechanical differentials, and the sine and cosine expressions may be derived alternatively by suitable potentiometers or mechanical elements such as a pin and slot arrangement. Moreover, the rotors and stators or the resolvers may be moved independently to add two angles instead of the single stage adding shown in FIGURE 2.

No amplifiers are shown in FIGURE 2, but it is clear that amplifier elements of suitable form may be added to the circuit as and where necessary.

In the co-pending application Serial No. 804,672, now abandoned, jointly with another inventor I have described the transmission of the necessary course parameters as resolved relative to two non-parallel lines, for example relative to North and East lines. If this type of transmission is employed the resolver R1 shown in FIGURE 2 is not necessary, since the two decoders associated with such a transmission system may be arranged to feed directly into the resolver R2 alternating voltages of phase and magnitude proportional to the factors $V_B \sin D_B$ and $V_B \cos D_B$.

It should be emphasised that the elements of the computation may be carried out in any order as is found to be most convenient and similarly the resolvers may be of the three-phase type to convey certain further advantages.

The most convenient action to take to avoid the collision is to adopt those course and speed changes which will most rapidly increase one's own component of velocity normal to the mutual bearing line.

It should be understood that the apparatus of the present invention is applicable to all freely manoeuvring vessels such as aircraft, ships and submarines and can also be used to evaluate the risk of collision with a stationary obstruction.

I claim:
1. Apparatus for determining the risk of collision between two vessels, comprising first means for computing the respective components of velocity of the two vessels along the mutual bearing line and for determining whether sum of such respective components is positive and second means for computing the respective components of velocity of the two vessels normal to the mutual bearing line and for determining whether the difference of such latter respective components is substantially zero.

2. Apparatus as claimed in claim 1, including resolver means for effecting the computation of velocity components in a specific direction.

3. Apparatus according to claim 2, wherein the resolver means comprises a plurality of two-phase rotor, two-phase stator synchro-resolvers.

4. Apparatus for determining the risk of collision between two vessels comprising means to derive a first alternating voltage dependent upon the speed of an intruding vessel, at least one resolver, means to apply said first alternating voltage to said at least one resolver, means to apply to said at least one resolver an angle representing the course of the intruding vessel relative to the mutual bearing line between the two vessels, thereby to obtain signals corresponding to the velocity of the intruding vessel along and normal to the mutual bearing line, means to derive a second alternating voltage dependent upon the speed of one's own vessel, a second resolver, means to apply said second alternating voltage to said second resolver, and means to apply to said second resolver an angle corresponding to the direction of the mutual bearing line relative to the course of one's own vessel, thereby to obtain signals corresponding to the velocity of one's own vessel along and normal to the mutual bearing line, means sensitive to substantial equality to compare the resolver outputs corresponding to velocities normal to the mutual bearing line and means sensitive to determine a sum greater than zero to add the resolver outputs corresponding to velocities along the mutual bearing line.

References Cited by the Examiner
UNITED STATES PATENTS 2,599,889 6/1952 Biggs et al.
2,933,726 4/1960 Campbell et al. _ _ _ _ _ _ 235—187

MALCOLM A. MORRISON, *Primary Examiner.*

ABRAHAM BERLIN, WALTER W. BURNS, Jr.,
*Examiners.*